United States Patent [19]

Fear

[11] 4,013,136
[45] Mar. 22, 1977

[54] BATTERY MOUNT

[75] Inventor: James R. Fear, Greenfield, Wis.

[73] Assignee: Allis-Chalmers Corporation, Milwaukee, Wis.

[22] Filed: Nov. 10, 1975

[21] Appl. No.: 630,742

[52] U.S. Cl. .............. 180/68.5; 180/89.12; 296/37.1

[51] Int. Cl.² .................................. B60R 18/02

[58] Field of Search ............... 180/68.5, 51, 69 R, 180/89 R, 89 A, 79.2; 248/503; 296/28 C, 37 R; 105/50, 51

[56] References Cited

UNITED STATES PATENTS

| | | | |
|---|---|---|---|
| 1,138,122 | 5/1915 | Lambert et al. | 180/68.5 |
| 2,010,052 | 8/1935 | Baker et al. | 296/37 R |
| 2,910,132 | 10/1959 | Beyerstedt | 180/68.5 |
| 2,985,351 | 5/1961 | DuShane et al. | 180/68.5 |
| 3,265,148 | 8/1966 | Foxwell | 180/68.5 |
| 3,356,174 | 12/1967 | Olsen | 180/68.5 |
| 3,433,502 | 3/1969 | Omon | 180/51 |
| 3,519,097 | 7/1970 | Commons | 180/89 R |
| 3,701,393 | 10/1972 | Lemons et al. | 180/89 R |
| 3,821,997 | 7/1974 | Sieren | 180/68.5 |
| 3,903,981 | 9/1975 | Peterson | 180/68.5 |

Primary Examiner—Robert R. Song
Assistant Examiner—David M. Mitchell
Attorney, Agent, or Firm—Arthur L. Nelson

[57] ABSTRACT

A pivotally mounted battery support pivotally supporting a battery under the rearward portion of the cab in the operating position and permitting said battery support to swing to the side of the vehicle adjacent the cab access ladder in the battery servicing position.

10 Claims, 6 Drawing Figures

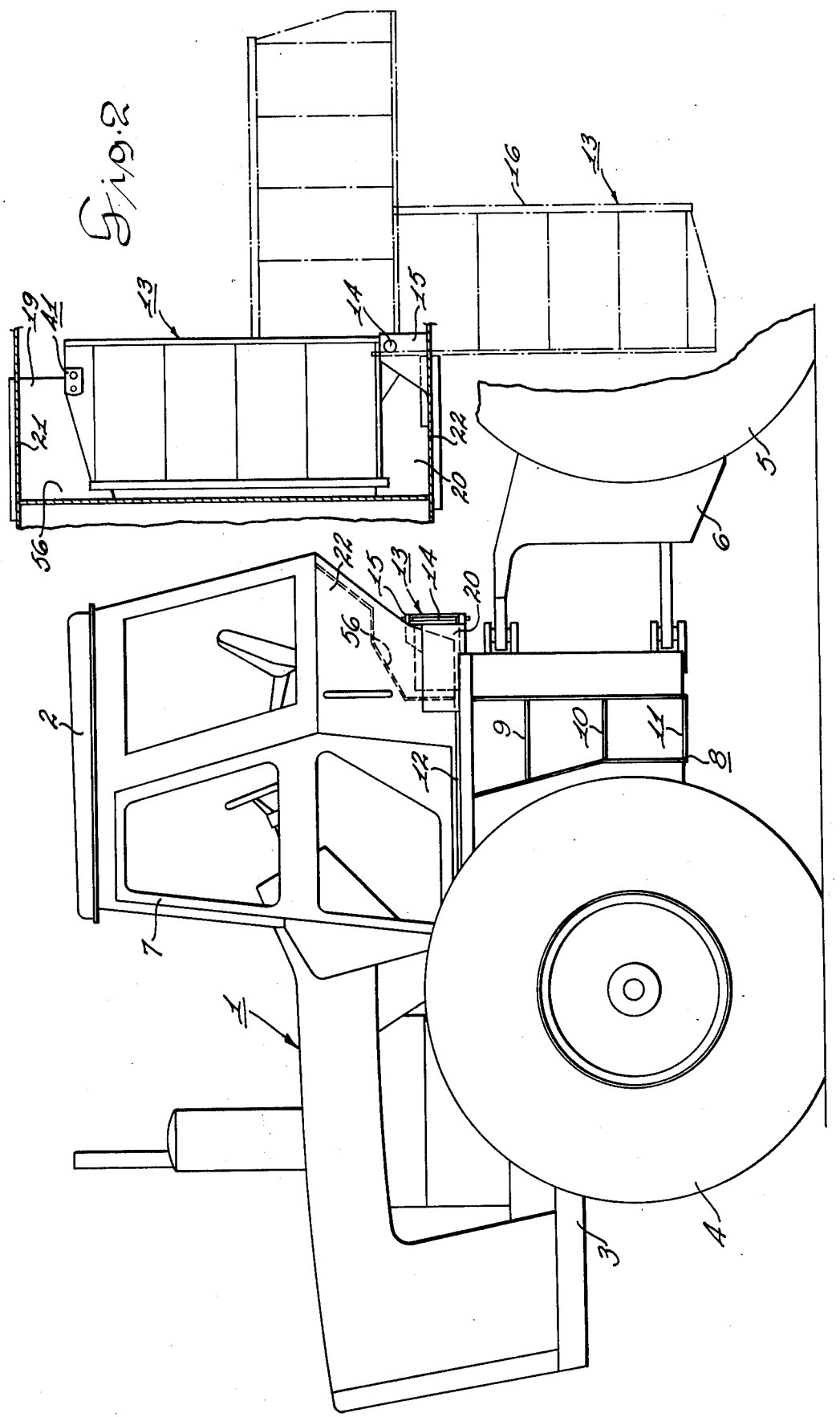

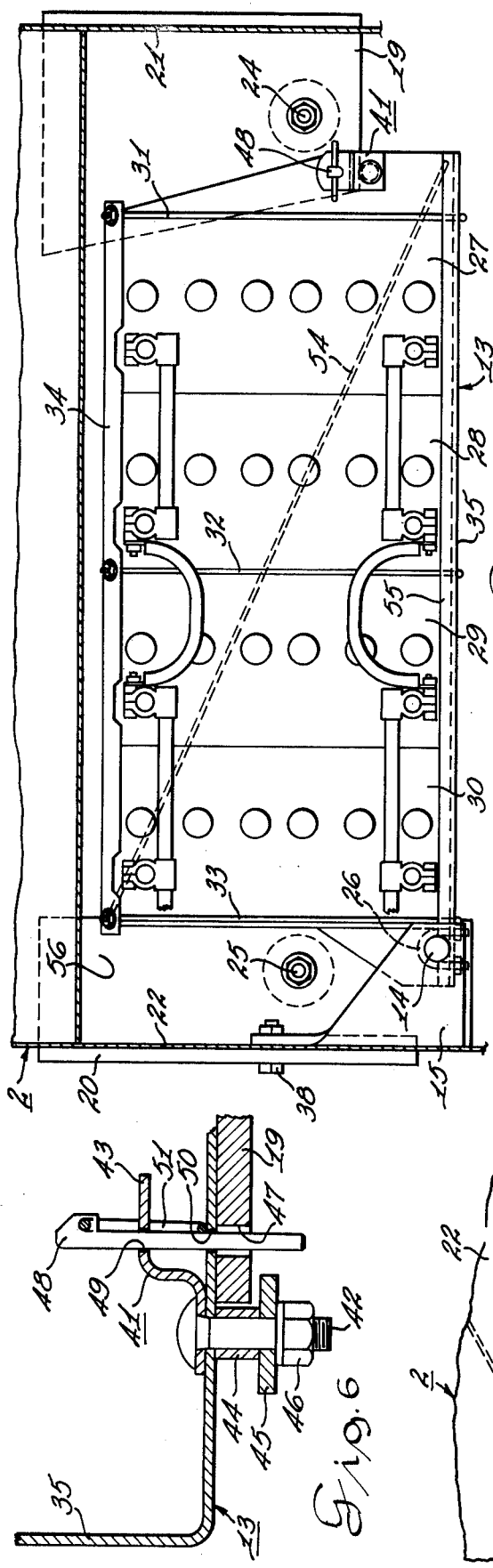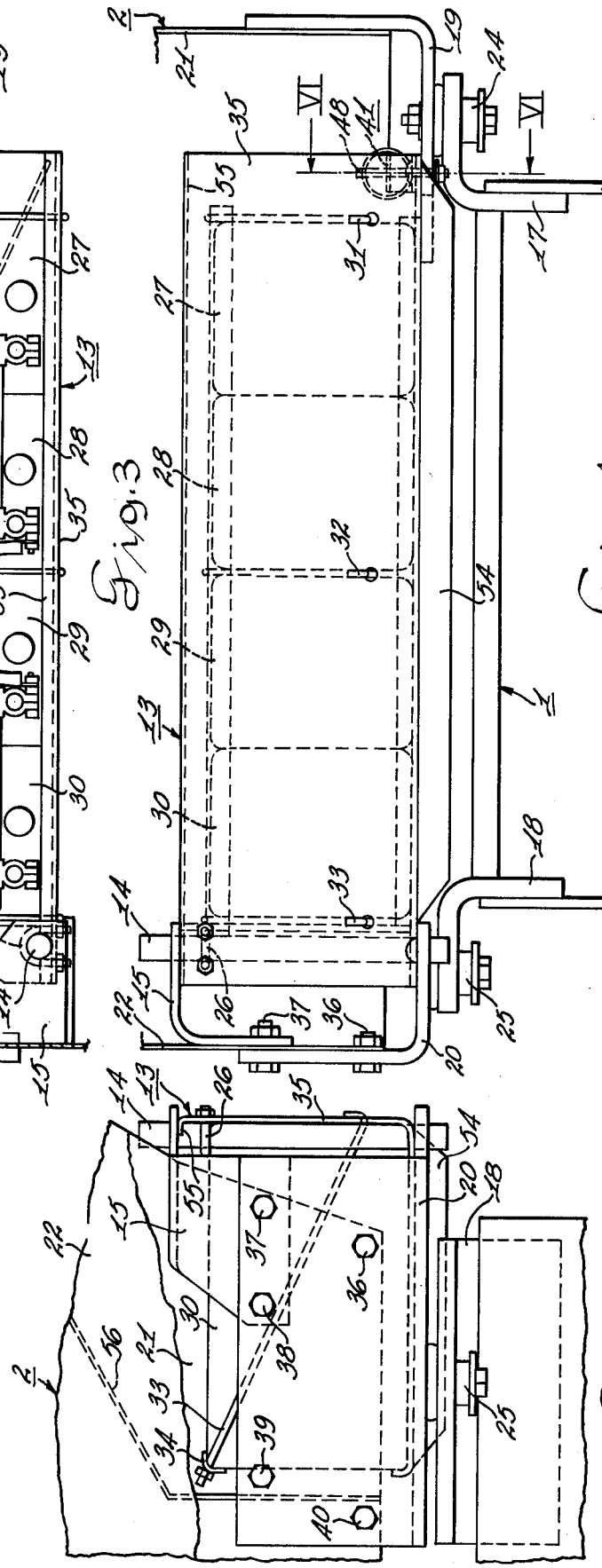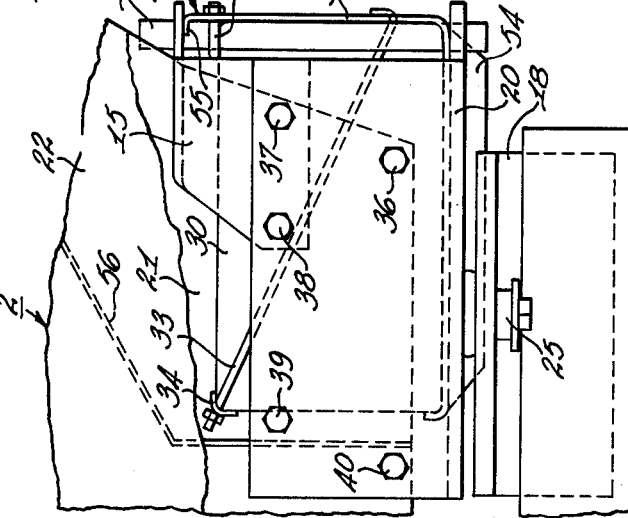

BATTERY MOUNT

This invention relates to a battery mount and more particularly to a pivotal battery mount swinging the battery under the rearward portion of the cab in the operating position and pivotally swinging the battery laterally of the cab adjacent the cab access ladder in the battery servicing position.

To conserve space the battery on a tractor should be mounted in a space not normally required for other auxiliary equipment and where it will not interfere with the operation of the tractor. The battery should be in a cool operating position so that engine heat does not cause excess evaporation from the battery cells. It is also advisable to mount the battery in a position where the battery can be easily serviced so that the battery will be functioning at maximum efficiency.

Accordingly, this invention provides for mounting of the battery on the rear underside of the cab. The cab is provided with a recessed portion underneath the seat at the operator station. The battery is mounted externally of the cab and is pivotally supported on the tractor with a latch to retain the battery in the operating position underneath the rear underside of the cab. The latch can be disengaged to permit swinging of the battery to a position laterally of the cab and adjacent to the access ladder for the cab. Accordingly, the operator can stand on the ladder and service the battery easily since he is in position above the battery so that he can see the condition of the fluid in the battery.

It is an object of this invention to provide a cab mounted battery pivotally supported under the cab in the operating position and to pivot to the side of the vehicle adjacent to the cab access ladder for servicing.

It is another object of this invention to provide a cab recessed under its backside to accommodate the pivotal mounting of a battery for positioning of the battery under the cab in its operating position and allow the battery to pivot approximately 180° to position the battery laterally of the cab adjacent to the cab access ladder for convenient servicing.

It is a further object of this invention to provide a cab and an access ladder aside the cab connected to the vehicle chassis. A safety handle is provided on the cab for the operator to grasp as he stands on the ladder on the side of the vehicle. A battery is pivotally mounted on the rear underside of the cab in a recess formed in the cab during its normal operating position and the pivotalsupport permits swinging of the battery approximately 180° pivotal support to a position adjacent the cab access ladder for convenient servicing.

The objects of this invention are accomplished by mounting a cab on a vehicle providing an operator station on a tractor. The rear end of the cab is formed with a recess on its underside to accommodate positioning of the battery underneath the cab. A battery mount is pivotally mounted in a manner to pivot the battery underneath the cab in its operating position in which the battery is latched to maintain the battery in its operating position. An access ladder is provided on the side of the chassis of the vehicle to provide access for the operator to the cab of the tractor. The battery is pivotally supported in a manner whereby the battery can be pivoted approximately 180° to a position alongside of the cab and adjacent to the cab access ladder. In this position the operator can conveniently service the battery to maintain good operating condition of the battery. The battery then can be pivoted back to a position underneath the rear underside of the cab in which it is latched in its operating position.

Referring to the drawings the preferred embodiments of this invention are illustrated.

FIG. 1 illustrates a side elevation view of the tractor with the battery pivotally mounted on the rear underside of the cab;

FIG. 2 is a plan view of the battery mounted in position under the cab with a phantom view showing the battery pivoted in 90° and 180°;

FIg. 3 is a plan view of the battery and latch with battery in its operating position;

FIG. 4 is a rear elevation view of FIG. 3 showing the battery latched in its operating position;

FIg. 5 is a side elevation view of FIG. 4; and

FIG. 6 is a section view taken on line VI—VI of FIG. 4.

Referring to the drawings FIG. 1 illustrates a tractor 1 showing a cab 2 mounted on the vehicle chassis 3. The tractor shown is an articulated tractor with front drive wheels 4 supported under the chassis 3 and rear drive wheels 5 supporting the rear frame 6 of the chassis for the tractor 1.

The cab 2 is provided with a door 7 which swings forwardly to allow the operator to gain access to the cab. The ladder 8 is mounted on the side of the chassis 3. The ladder includes the three steps 9, 10 and 11 and preferably positioned for a step 12 adjacent to the doorway of the cab.

FIG. 2 shows a battery tray 13 pivotally mounted on the pin 14. The pin 14 is supported by the brackets 15 and 20 which in turn is mounted on the vehicle chassis under the cab.

The battery tray 13 is shown supporting four batteries side by side. The battery tray 13 is supported on its end opposite the pivot pin to provide a solid support for the battery tray.

The battery tray 13 is shown in a phantom view wherein the tray is pivoted to the servicing position 16.

FIGS. 3, 4 and 5 show more detailed views of the battery mounting on the tractor. The chassis 3 includes the beams 17 and 18 which form a support for the brackets 19 and 20. The bracket 19 is connected to the panel 21 of the cab 2. The bracket 20 is connected to the panel 22 of the cab 2. The bracket 20 supports the panel 22 of the cab 2 as well as the bracket 15. The bolts 38 and 37 fasten the bracket 15 and panel 22 to the bracket 20. The mounts 24 and 25 connect brackets 17 and 19 and brackets 18 and 20, respectively.

The bracket 19 supports the one end of the tray 13 remote from the pivotal support brackets 20 and 15. A latch is more specifically shown in FIG. 6. The tray is provided with holes to receive the U-bolt 26 which fastens the end portion of the tray 13 to the pin 14. The pin 14 extends upwardly through a hole in the bracket 15 and downwardly through a hole in bracket 20 to provide a pivotal support for the tray 13.

A plurality of batteries 27, 28, 29 and 30 are mounted on the battery tray 13. A plurality of tie bolts 31, 32 and 33 are connected through the strap 34 to fasten the batteries firmly against the wall 35. Suitable cables connect the batteries in parallel and the cables extend from the battery adjacent the pivotal support pin 14 for electrically connecting the batteries to electrical equipment on the tractor.

The end view 5 shows a plurality of bolts 36, 37, 38, 39 and 40 connecting bracket 20 to panel 22. Bolts 37 and 38 connect the bracket 20 with the bracket 15.

The latch is more clearly illustrated in FIG. 6. The battery tray 13 is fitted with a latch element 41 extending from the bolt 42 wherein the flange 43 is in spaced relation from the tray 13. The bolt 42 is received within the sleeve 44, the washer 45, and the nut 46 holds the latch element 41 firmly in position on the tray.

The bracket 19 is permitted to slide between battery tray 13 and the washer 45. The bracket 19 forms the hole 47 for receiving a pin 48. The pin extends through the hole 49 in the flange 43 as well as the hole 50 in tray 13 and the hole 47 in bracket 19. The pin 48 is also provided with a ring 51 which pivots under the flange 43 and retains the pin 48 in its latch position to latch the battery tray to the bracket 19 and hold the battery in its operating position as shown in FIG. 3.

The battery tray 13 is also provided with a reinforcing strip 54 welded to its underside to provide rigidity to the tray. The tray may also be provided with a partial cover flange 55 which extends inwardly into the recess 56 in the rear underside of the cab 2. This gives partial protection for the battery in its operating position. However, it is optional to use the tray having the cover flange 55. The flange 55 may extend further into the recess 56 if desired.

The operation of the device will be described in the following paragraphs.

FIG. 1 illustrates the vehicle cab 2 mounted on the vehicle chassis 3. The recess 56 is formed in the lower rear side of the cab to accommodate positioning of the battery support and the batteries for use on the vehicle. The recess 56 is positioned rearwardly under the seat of the vehicle.

The bracket 20 is mounted on the vehicle chassis and connected to the cab to provide a rigid support for the battery tray 13. The battery tray 13 is pivotally supported on the pin 14 and also supported on its opposite end on the bracket 19. The latch 41 is shown in the latched position holding the tray on the bracket 19 in the battery operating position.

Vehicle access ladder 8 is positioned on the side of the vehicle chassis 3 to provide access to the vehicle cab 2. The battery tray 13 is pivotal on the pin 14 and can pivot 180° to servicing position which positions the batteries adjacent to the access ladder 8. The pivotal battery mount is designed for use with a large vehicle in which an access ladder 8 is needed to gain access to the cab. It would not be convenient to service a battery when the operator is standing on the ground adjacent to the vehicle. The access ladder provides a means whereby the operator can view the batteries from the top and quickly check the fluid level in the cells. Any servicing of the battery can be accomplished conveniently from the access ladder. A phantom view of the servicing position is shown in FIG. 2 wherein the battery is rotated approximately 180° from its operating position.

Once the battery is serviced, it can then be pivoted to the operating position as shown under the vehicle cab. When the battery tray 13 is pivoted to this position, the pin 48 is inserted into the opening 49 in flange 43 of the latch element 41. The pin is also inserted into the opening 50 of the tray 13 as well as the hole 47 in the bracket 19. In this position, the ring 51 is lowered around the flange 43 and the battery tray is latched in its operating position. The vertical wall 35 provides a protective wall for the batteries in the normal operating position on the vehicle. The batteries 27, 28, 29 and 30 are mounted on the battery tray and held in position by the strap 34 by means of the tie bolts 31, 32 and 33. The batteries are firmly held in position on the tray in this manner.

The embodiments of the invention in which an exclusive property or privilege is claimed are defined as follows:

1. A battery servicing device including pivotal battery mount for use on a vehicle comprising, a vehicle chassis, a cab mounted on said vehicle chassis, said cab defining a recessed portion on its lower rear side, a battery tray for supporting at least one battery, pivotal support means defining a vertical pivotal axis on one side of said chassis to the rear of said cab including a bracket mounted on said vehicle pivotally supporting said battery tray in the recessed portion across said cab in the operating position and permitting pivotal movement to a position extending laterally from said cab for servicing, a tray support mounted on said vehicle in spaced relation to said pivotal support means for support of a portion of said battery tray in its operating position, a latch connected between said tray support and said battery tray for latching said tray in the operating position, retainer means on said tray for retaining batteries on said tray, a cab access ladder on said one side of said chassis for gaining access to said cab and for servicing said battery when said battery is pivoted to the said one side of said cab.

2. A battery servicing device including pivotal battery mount for use on a vehicle as set forth in claim 1 wherein said tray includes means for supporting a plurality of batteries on said battery tray.

3. A battery servicing device including pivotal battery mount for use on a vehicle as set forth in claim 1 wherein said means defining a pivotal axis includes a pivot pin pivotally supported on said vehicle and pivotally supporting said battery tray.

4. A battery servicing device including pivotal battery mount for use on a vehicle as set forth in claim 1 wherein said battery tray defines an external wall delineating the battery compartment underneath said cab on the rearward side of said vehicle cab.

5. A battery servicing device including pivotal battery mount for use on a vehicle as set forth in claim 1 wherein said battery tray defines an external wall on the outward side of said battery compartment, said battery tray defines an upper protective portion integral with said external wall for protecting the top of the battery.

6. A battery servicing device including pivotal battery mount for use on a vehicle as set forth in claim 1 including at least one battery on said battery tray, said retainer means defines a hold down clamp holding said battery firmly on said battery tray to swing with said battery tray when said battery tray is pivoted.

7. A battery servicing device including pivotal battery mount for use on a vehicle as set forth in claim 1 wherein said pivotal means includes means providing pivotal movement of at least 180° from the operating position of said battery tray to the servicing position of said battery tray.

8. A battery servicing device including pivotal battery mount for use on a vehicle as set forth in claim 1 wherein said tray support defines a tray rest engaging said battery tray at the end opposite from the pivotal support means and defining the operating position of said battery tray when said battery is pivoted underneath said vehicle cab.

9. A battery servicing device including pivotal battery mount for use on a vehicle as set forth in claim 1 wherein said cab defines a forwardly downwardly sloped rear side to form said recessed portion in said cab.

10. A battery servicing device including pivotal battery mount for use on a vehicle as set forth in claim 1 wherein said cab defines a platform, said pivotal support means defines a pivotal support mounting said battery tray for supporting a battery on approximately the same level as said platform.

* * * * *